C. L. SMITH AND E. S. WEBSTER.
RASPING WHEEL.
APPLICATION FILED AUG. 1, 1919.

1,347,299. Patented July 20, 1920.

Clyde L. Smith
Emmett S. Webster
INVENTORS

By George J. Oltsch
ATTORNEY.

UNITED STATES PATENT OFFICE.

CLYDE L. SMITH AND EMMETT S. WEBSTER, OF SOUTH BEND, INDIANA, ASSIGNORS, BY MESNE ASSIGNMENTS, TO SMITH ONE HEAT SYSTEM, OF SOUTH BEND, INDIANA, A CORPORATION OF INDIANA.

RASPING-WHEEL.

1,347,299.  Specification of Letters Patent.  Patented July 20, 1920.

Application filed August 1, 1919. Serial No. 314,678.

*To all whom it may concern:*

Be it known that we, CLYDE L. SMITH and EMMETT S. WEBSTER, citizens of the United States, residing at South Bend, in the county of St. Joseph and State of Indiana, have invented certain new and useful Improvements in Rasping-Wheels, of which the following is a specification.

The invention relates to a rasping wheel designed primarily for removing rubber stock from tire casings or shoes.

The object of the invention resides in the provision of a rasping wheel which will be particularly adapted for quickly removing the tread portion or outer rubber layer of rubber tires or shoes, and thus facilitating and rendering more easy the retreading of new tires having defective treads, or old worn tires still having a good fabric base or carcass. A further object resides in the provision of a device for the purpose stated which will be peculiarly effective for rasping tenacious elastic rubber, the device having structural characteristics which under high speed will tend to cut, shred and tear the rubber into fragments in a most rapid manner.

With the above and other objects in view, the invention in the preferred form of details will be described in the following specification, reference being had particularly to the accompanying drawings, in which:—

Referring now more particularly to the drawings, the wheel proper is preferably made of wood, and is provided with a central aperture 5, to permit mounting thereof upon a shaft or arbor adapted for driving the same at high speed. The face of the wheel is also preferably made relatively broad, so as to have a rasping surface of considerable area.

The rasping elements 6 consist of a multiplicity of metal pins, preferably of steel, arranged in close formation and extending from the face of the wheel. The pins are round in section and provided with blunt ends, so that each is provided with a circular cutting edge at 7. The blunt ends of the pins as worn away by friction tend to automatically keep the cutting edges 7 thereof sharp, and by virtue of having such blunt ends the danger of cutting into or damaging the fabric of the tire carcass in rasping away the rubber tread is reduced to a minimum. Also, as the result of having circular cutting edges, the wheel may be reversed on its driving shaft or arbor at intervals, and the wear on the pins equalized, the pins functioning the same in either direction of rotation of the wheel.

Figure 1:
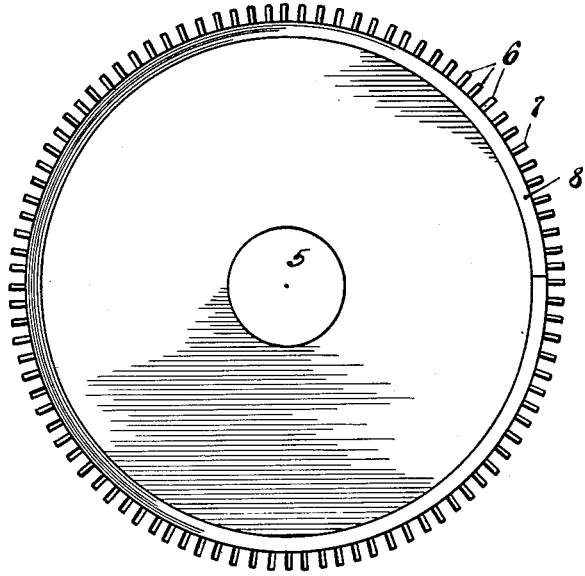
Figure 1 is a side elevation of a rasping wheel constructed in accordance with the invention.
Figure 2:
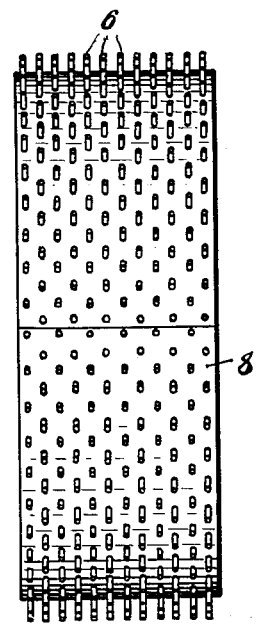
Fig. 2 is a face view thereof.
Figure 3:
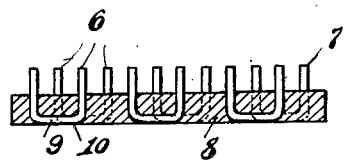
Fig. 3 is a cross section of the wheel facing element carrying the rasping elements.

To facilitate replacement of the pins when worn, we prefer to mount the same on a flexible strip 8, preferably leather, the strip being secured to the wooden wheel in any suitable manner which will permit the ready removal thereof for the placement of a new strip. The wooden wheel may thus be used indefinitely. The pins really consist of the free ends of U-shaped members or staples, which are driven through the leather strip crosswise thereof and in staggered relation, the base portions 9 of the staples also being forced into the strip a sufficient distance so as to bring the same flush with the inner side thereof as indicated at 10 in Fig. 3. The base portions of the staples thus abut the periphery or face of the wooden wheel with the strip in position, thereby preventing inward movement thereof, and by virtue of being firmly embedded in part in the strip, the projecting portions forming the pins will be rigidly held.

It will be apparent from the foregoing to those skilled in the art. that a rasping wheel of the character set forth will be highly efficient for rasping away the rubber tread portions of tire casings or shoes, and as involving in the use thereof a material saving of time and labor as compared with the present crude method of accomplishing the same result by manually manipulated tools.

While the foregoing is the preferred form of our invention, it is to be understood that we do not limit ourselves to the precise structure shown and described, as it is obvious that the same may be variously modified without departing from the spirit of the invention.

What is claimed is:—

1. A rasping wheel comprising a series of blunt-ended pins extending from the face thereof, the meeting point of the blunt end and sides of a pin forming a cutting edge coextensive with the marginal dimension of such pin end.

2. A rasping wheel including a flexible strip secured to and encompassing the face thereof, said strip having a series of U-shaped members embedded in part therein, the free ends of which extend beyond the outer side of the strip, and their base portions seated against the wheel.

3. A rasping element comprising a flexible strip having a series of U-shaped members piercing the same, the free ends of the members extending beyond one side of the strip, and the base portion of the members being sunken in the strip to fall flush with the opposite face of the strip.

In testimony whereof we affix our signatures.

CLYDE L. SMITH.
EMMETT S. WEBSTER.